(12) United States Patent
Hallonsten et al.

(10) Patent No.: US 11,802,936 B2
(45) Date of Patent: Oct. 31, 2023

(54) DETERMINING A POSITION OF A DEVICE WITH RESPECT TO ANOTHER DEVICE

(71) Applicant: Sony Corporation, Tokyo (JP)

(72) Inventors: Andreas Hallonsten, Lund (SE); Johan Andersson, Lund (SE); Johan Wadman, Lund (SE); Kåre Agardh, Rydebäck (SE)

(73) Assignee: Sony Network Communications Europe B.V., Hoofddorp (NL)

( * ) Notice: Subject to any disclaimer, the term of this patent is extended or adjusted under 35 U.S.C. 154(b) by 747 days.

(21) Appl. No.: 16/962,267

(22) PCT Filed: Jan. 15, 2019

(86) PCT No.: PCT/EP2019/050917
§ 371 (c)(1),
(2) Date: Jul. 15, 2020

(87) PCT Pub. No.: WO2019/138130
PCT Pub. Date: Jul. 18, 2019

(65) Prior Publication Data
US 2021/0063521 A1    Mar. 4, 2021

(30) Foreign Application Priority Data

Jan. 15, 2018 (SE) .................... 1830012-9

(51) Int. Cl.
*G01S 5/02* (2010.01)
*G01S 5/04* (2006.01)
(Continued)

(52) U.S. Cl.
CPC ................. *G01S 5/12* (2013.01); *G01S 5/04* (2013.01); *H04W 4/023* (2013.01); *G01S 5/0081* (2013.01);
(Continued)

(58) Field of Classification Search
CPC .......... G01S 5/02213; G01S 5/04; G01S 5/14; H04W 64/00; H04W 4/023; H04W 4/80
See application file for complete search history.

(56) References Cited

U.S. PATENT DOCUMENTS 5,973,643 A * 10/1999 Hawkes ................ H04W 64/00
                                                            455/456.5
8,018,383 B1 * 9/2011 Schantz .............. G01S 5/02213
                                                            342/453

(Continued)

FOREIGN PATENT DOCUMENTS

| CN | 106154222 A | 11/2016 |
| EP | 2809095 A1 | 12/2014 |
| WO | 2013003636 A2 | 1/2013 |

OTHER PUBLICATIONS

International Search Report and Written Opinion for corresponding International Patent Application No. PCT/EP2019/050917 dated Mar. 20, 2019.

*Primary Examiner* — Gregory C. Issing
(74) *Attorney, Agent, or Firm* — Renner, Otto, Boisselle & Sklar, LLP

(57) ABSTRACT

The present invention relates to a method for determining a position of a first device with respect to a second device. According to the method, control data indicative of a receive property of at least one signal received from the first device (110) by a second device (121-124) using a plurality of receiver chains (210-215) is established. At least one receive characteristic of the plurality of receiver chains (210-215) differs for at least two receiver chains of the plurality of receiver chains (210-215). Based on the control data, positioning information for the first device (110) is determined.

14 Claims, 3 Drawing Sheets

(51) Int. Cl.
   *H04W 4/02*     (2018.01)
   *G01S 5/12*     (2006.01)
   *H04W 4/80*     (2018.01)
   *G01S 5/00*     (2006.01)
   *H04W 84/12*    (2009.01)

(52) U.S. Cl.
   CPC ........... *G01S 5/02213* (2020.05); *H04W 4/80* (2018.02); *H04W 84/12* (2013.01)

(56) References Cited

U.S. PATENT DOCUMENTS

| | | | | |
|---|---|---|---|---|
| 9,929,925 | B2* | 3/2018 | Choi | H04W 12/12 |
| 2004/0032363 | A1* | 2/2004 | Schantz | G01S 11/06 |
| | | | | 342/146 |
| 2008/0204322 | A1* | 8/2008 | Oswald | G01S 5/04 |
| | | | | 342/465 |
| 2009/0191894 | A1* | 7/2009 | Poegel | G01S 5/02213 |
| | | | | 455/456.1 |
| 2009/0280742 | A1* | 11/2009 | Schantz | H04B 5/02 |
| | | | | 455/41.1 |
| 2012/0178471 | A1 | 7/2012 | Kainulainen et al. | |
| 2014/0355517 | A1* | 12/2014 | Reunamaki | H04W 8/005 |
| | | | | 370/328 |
| 2014/0370917 | A1* | 12/2014 | Buchheim | H04W 4/023 |
| | | | | 455/456.1 |
| 2015/0195674 | A1 | 7/2015 | Opshaug et al. | |
| 2016/0370453 | A1* | 12/2016 | Boker | G01S 5/0218 |
| 2018/0267131 | A1* | 9/2018 | Simileysky | H04W 4/026 |
| 2019/0137596 | A1* | 5/2019 | Silverman | G01S 5/06 |
| 2020/0178054 | A1* | 6/2020 | Simileysky | H04B 17/336 |

* cited by examiner

DETERMINING A POSITION OF A DEVICE WITH RESPECT TO ANOTHER DEVICE

TECHNICAL FIELD

Various examples of the present invention relate to methods and devices for determining position information of a device, for example a terminal device, with respect to another device, for example another terminal device, an access point or a base station of a wireless communication system.

BACKGROUND OF THE INVENTION

Positioning of a device, for example determining a geographical position of the device, is important in connection with mobile devices, for example mobile telephones, digital cameras, mobile computers and the Internet of Things (IoT). Positioning of a device may be necessary to offer tailored services for the current location, tracking services and emergency dispatching. Wireless communication technologies such as cellular, Wi-Fi and Bluetooth are increasingly used for location-based services. Devices are located with the help of signal strength, propagation time of a radio signal, detection of direction or other measurable parameters.

Various technologies for determining a position of a device are available for different types of devices, for example GNSS (global navigation satellite system), A-GNSS (assisted global navigation satellite system), OTDOA (observed time difference of arrival), E-CID (enhanced cell identification), UTDOA (uplink time difference of arrival) as well as other 3GPP RAT (third generation partnership program, radio access technology) independent indoor positioning methods which may be specified, for example for Wi-Fi environments based on RSSI (received signal strength indicator) and FTM (Fine Timing Measurements), BT (Bluetooth) based positioning, barometric pressure sensor positioning and Terrestrial Beacon Systems (TBS).

In an exemplary technology, an approximate distance to a specific device (target device) is measured at multiple known locations (usually three or more locations) by observer devices, followed by a triangulation calculation that determines the approximate absolute location of the target device with respect to the observer devices.

Wireless technologies often used for a triangulation may include GPS/GNSS, Wi-Fi, cellular and Bluetooth low energy (BT LE). The different technologies may have different properties and may be selected and improved with respect to accuracy, latency, power consumption and spectral efficiency.

In particular for industry, healthcare and other B2B verticals, Bluetooth LE and Wi-Fi may be used together or separately for tracking positions of moving objects in an indoor and outdoor environment. Such applications may be very demanding with respect to power consumption (battery lifetime), acquisition time and position accuracy. Further, the observing system should be simple, low-cost, robust and durable.

For example, Bluetooth LE signal strength between devices may be measured and used for triangulation. According to the Bluetooth standard, these signals (also called beacon signals) may be transmitted on three different channels, also called advertising channels, on low/mid/high frequencies, which are received by different receivers and used to determine an absolute position of the target device, for example in a server or cloud service.

SUMMARY OF THE INVENTION

In view of the above, there is a demand for further improvements in the field of positioning with respect to accuracy, power consumption and spectral efficiency.

According to the present invention, this object is achieved by a method, a device and a system as defined in the independent claims. The dependent claims define embodiments of the invention.

According to an embodiment of the present invention, a method is provided. According to the method, control data indicative of a receive property of at least one signal received from a first device by a second device using a plurality of receiver chains is established. Based on the control data, position information for the first device is determined. At least one receive characteristic of the plurality of receiver chains differs for at least two receiver chains of the plurality of receiver chains.

The first device may comprise a device whose position is to be determined. In the following, the first device will also be called target device. The first device may comprise a terminal device or a mobile device, for example a mobile telephone, in particular a smart phone, an Internet of Things (IoT) device, a personal digital assistant, a mobile music player, a mobile computer, a mobile navigation system or a wearable electronic equipment. A wearable electronic equipment, also called wearable device or smart mobile accessory, may comprise a wearable computer, also known as body born computer or simply wearable, which is an electronic device that may be worn by a user under, with or on top of clothing.

The second device may comprise a device which is part of a system for determining the position of the first device. In the following, the second device will also be called observer device. For example, the second device may comprise an access point device of a wireless communication network, a relay device of a wireless communication network, or a base station of a wireless communication network. Furthermore, the second device may comprise another terminal device, for example a navigation device, a stationary or mobile computer or a mobile phone. In particular, the second device may comprise an access point device of a Wi-Fi communication network or a communication device providing a Bluetooth communication.

The signal may comprise a beacon signal. For example, the signal may comprise a beacon signal communicated on three different wireless communication channels. In particular, the signal may comprise a beacon signal communicated on three advertising channels defined in the Bluetooth low energy standards.

The signal may further comprise an identifier indicative of the first device.

As defined above, the observer device comprises a plurality of receiver chains having different receive characteristics. The receive characteristics may relate to physical characteristics of the receiver chains, for example a receiver directionality of an antenna arrangement associated with the respective receiver chain, a polarisation sensitivity of an antenna arrangement associated with the respective receiver chain, and/or a receive bandwidth of the respective receiver chain.

The receive property relates to the received beacon signals. The receive property may indicate for example an amplitude and phase of each of the received beacon signals.

For example, a single beacon signal transmitted from the first device (target device) may be received by each of the plurality of receiver chains of the second device (observer device). Thus, the receive property may indicate a plurality of amplitudes and phases of the beacon signal as received by the plurality of receiver chains.

The control data may represent a relation or assignment between the receive property and the receiver chains and their configurations used when receiving the beacon signal. Thus, the control data provides information necessary for determining the position information for the target device. For example, the control data may be generated based on the receive property and the at least one receiver characteristic of the plurality of receiver chains.

Determining the position information based on the control data may be performed in the second device (observer device).

As an alternative, the at least one receive property and the at least one receive characteristic of the plurality of receiver chains may be communicated from the second device to a server or a cloud service. The server or the cloud service may establish or determine the control data based on the at least one receive property and the at least one receive characteristic of the plurality of receiver chains.

The position information may be determined by a server or a cloud service. For example, the control data may be determined at the server or the cloud service, or the control data may be communicated from the second device (observer device) to the server or the cloud service.

The positioning information may comprise a distance information relating to a distance between the first device and the second device, or the positioning information may comprise an angle information relating to an angle of arrival of the at least one signal from the first device at the second device.

Based on the control data, the second device may determine the distance information and/or the angle information.

As an alternative, the server or the cloud service may determine, based on the control data, the distance information and/or the angle information. Furthermore, the server or cloud service may determine a geographic location information based on the control data or the position information from a plurality of second devices (observer devices). For example, the server or the cloud service may determine the geographic location information by triangulation. The geographic location information may comprise for example location coordinates with respect to a reference coordination system, for example an absolute global coordination system or a coordination system with respect to an arrangement of a plurality of second devices.

According to an embodiment, the at least one signal comprises a plurality of different signals. The signals may be different with respect to their transmission frequency or bandwidth. The different signals of the plurality of signals may be received by different receiver chains of the plurality of receiver chains. The control data is indicative of an association between the receiver chains and the received signals. Furthermore, different signals of the plurality of signals may be received by different antenna arrangements associated with the plurality of receiver chains. The control data may indicate an association between the receiver chains, the antenna arrangements and the signals. For example, an assignment between the different antenna arrangements and receiver front ends of the receiver chains may be dynamically modified, such that for example an antenna arrangement may be assigned subsequently to the different receiver front ends. Thus, depending on the assignment, beacon signals transmitted in a certain channel (frequency) may be received subsequently at different antenna arrangements having different receive characteristics. For example, by subsequently combining antenna arrangements with different directionality to receiver front ends with different receive channels, beacon signals of all channels may be received with different directionalities or omnidirectional. Thus, receive quality may be improved and disturbances may be reduced.

For example, if the at least one signal comprises a plurality of signals, different signal of the plurality of signals may be received by different receiver chains of the plurality of receiver chains. The control data is indicative of multiple sets of the plurality of signals received by the second device using the plurality of receiver chains. Different sets of the multiple sets implement different associations between the plurality of receiver chains and the plurality of signals. For example, an assignment of receive characteristics, for example the receive bandwidth or the receive channel, to the receiver chains may be varied. The control data may indicate such assignment, for example the receive properties when a certain signal is received at a certain receiver chain.

In particular, different signals of the plurality of signals may be received by different antenna arrangements associated with the plurality of receiver chains. The control data is indicative of multiple sets of the plurality of signals received by the second device using the antenna arrangements and the plurality of receiver chains. Different sets of the multiple sets implement different associations between the plurality of receiver chains, the antenna arrangements and the plurality of signals. In other words, the control data may also be influenced by reconfigurations of the receiver chains, for example when an assignment between the receiver front ends and the antenna arrangements is changed. Changing the assignment between the receiver front ends and the antenna arrangements may be advantageous when receiving the plurality of signals with single channel receiver front ends for reducing noise and spatial disturbances and for gaining omnidirectional reception.

For example, the at least one signal may comprise a plurality of signals communicated on different wireless communication channels. The plurality of receiver chains may comprise for each one of the wireless communication channels at least one receiver chain associated with the respective wireless communication channel. The receive characteristics of a receiver chain may relate to a receive bandwidth of the respective receiver chain. The receive bandwidth may correspond to a bandwidth of the wireless communication channel associated with the respective receiver chain. This may enable cost-effective and reliable low noise receiver chains.

According to embodiments, the plurality of signals are communicated on the wireless communication channels within a certain time interval. The certain time interval may have a duration of not more than 15 ms, optionally not more than 10 ms and further optionally not more than 2 ms. As an example, the certain time interval may have a duration of about 1 ms.

With the plurality of receiver chains the plurality of beacon signals transmitted within a short time duration may be evaluated more or less simultaneously such that a high position accuracy may be achieved. Furthermore, by evaluating several or all beacon signals at each observer device, positioning accuracy may be increased and a time interval between the transmissions of the beacon signals may be increased such that an energy consumption at the target device may be reduced and the energy for transmitting the beacon signals may be used more efficiently.

According to some embodiments, for each second device of multiple second devices respective control data is established. The respective control data is indicative of a receive property of at least one signal received from the first device by the respective second device using a plurality of receiver chains. Furthermore, for each second device of the multiple second devices positioning information for the first device is determined based on the control data established by the respective second device. Based on the positioning information determined by the multiple second devices, location information for the first device is determined. The location information may comprise for example geographic location coordinates with respect to a reference coordination system, for example an absolute global coordination system or a coordination system with respect to an arrangement of a plurality of second devices.

For example, the positioning information of each of the multiple second devices may be communicated to a server or a cloud service and the location information for the first device may be determined in the server or the cloud service based on triangulation. In another example, the positioning information of each of the multiple second devices may be communicated among the multiple second devices or maybe gathered at at least one of the multiple second devices, and at least one of the multiple second devices may use this gathered positioning information for determining the location information for the first device using for example a triangulation. When determining location information for the first device, location information of each of the plurality of second devices may be considered. The location information of the plurality of second devices may be pre-configured.

According to another embodiment, for each receiver chain of the plurality of receiver chains raw positioning information is determined based on the receive property of the at least one signal received by the respective receiver chain. For example, the raw positioning information may comprise a received signal strength indication (RSSI) of the at least one signal received by the respective receiver chain. The raw positioning information for the plurality of receiver chains may be averaged to determine the position information. For example, based on the averaged raw positioning information, a distance between the first and second devices may be determined. By averaging the raw positioning information, noise and other disturbances, which may influencing accuracy, may be reduced.

According to other embodiments, for each receiver chain of the plurality of receiver chains a received signal strength information of the received at least one signal is determined, for example an amplitude value of a received signal strength. Based on the determined received signal strength information, one receiver chain of the plurality of receiver chains is selected. For example, the receiver chain providing the strongest received signal may be selected. The control data may be established using the selected receiver chain. For example, the control data may be established using the selected receiver chain only. As the quality of the received signals may vary significantly due to disturbances, reflections, attenuation, distance, direction and so on, it may be advantageous to select at each point in time the channel with the strongest received signal for determining the positioning information.

According to a further embodiment, each receiver chain of the plurality of receiver chains is associated with a respective antenna arrangement. A distance between two antenna arrangements of the receiver chains may be less than 10 cm. This may compensate local fading effects.

In other embodiments, the antenna arrangements may be arranged such that each antenna arrangement has a different rotation or orientation. This may contribute to compensate imperfections in lobe characteristics of the antenna arrangements and may enable accurate signal reception of signals coming from different directions due to reflections. Further, an omnidirectional reception may be enabled, in particular independent of a current orientation of the first device.

According to another embodiment of the present invention, a device is provided. The device comprises a plurality of receiver chains and a processing unit. At least one receive characteristic of the plurality of receiver chains differs for at least two receiver chains of the plurality of receiver chains. The processing unit is configured to establish control data indicative of a receive property of at least one signal received from another device using the plurality of receiver chains, and to determine, based on the control data, positioning information for the other device. The device may comprise an access point or a base station of a wireless communication system. In other words, the device may comprise an observer device for observing the position of the other device which may be called target device. The target device may comprise a user equipment, for example a mobile terminal, in particular a smart phone, an Internet of Things (IoT) device or a wearable device. Based on the plurality of receiver chains, an accuracy of the positioning information, which may indicate a distance between the observer device and the target device, may be improved.

According to embodiments, the device may be configured to perform the above-described method and the embodiments thereof as the second device, wherein the other device is the first device.

According to other embodiments of the present invention, a system is provided comprising a first device and a second device. The system may be configured to perform the above-described method and the above-described embodiments of the method. The system may comprise a server or a cloud service, wherein at least one of establishing the control data and determining the positioning information is performed by the server and the cloud service, respectively.

Although specific features described in the above summary and the following detailed description are described in connection with specific embodiments and aspects of the present invention, it should be noticed that the features of the exemplary embodiments and aspects described herein may be combined with each other unless specifically noted otherwise.

BRIEF DESCRIPTION OF THE DRAWINGS

The present invention will now be described in more detail with reference to the accompanying drawings.

DETAILED DESCRIPTION OF PREFERRED EMBODIMENTS

In the following, exemplary embodiments of the present invention will be described in more detail. It is to be understood that the features of the various exemplary embodiments described herein may be combined with each other unless specifically noted otherwise. Any coupling between components or devices shown in the figures may be a direct or indirect coupling unless specifically noted otherwise. Furthermore, any coupling between components or devices may comprise a wireless or a wire-based coupling. Same reference signs in the various drawings refer to similar or identical components.

Figure 1:
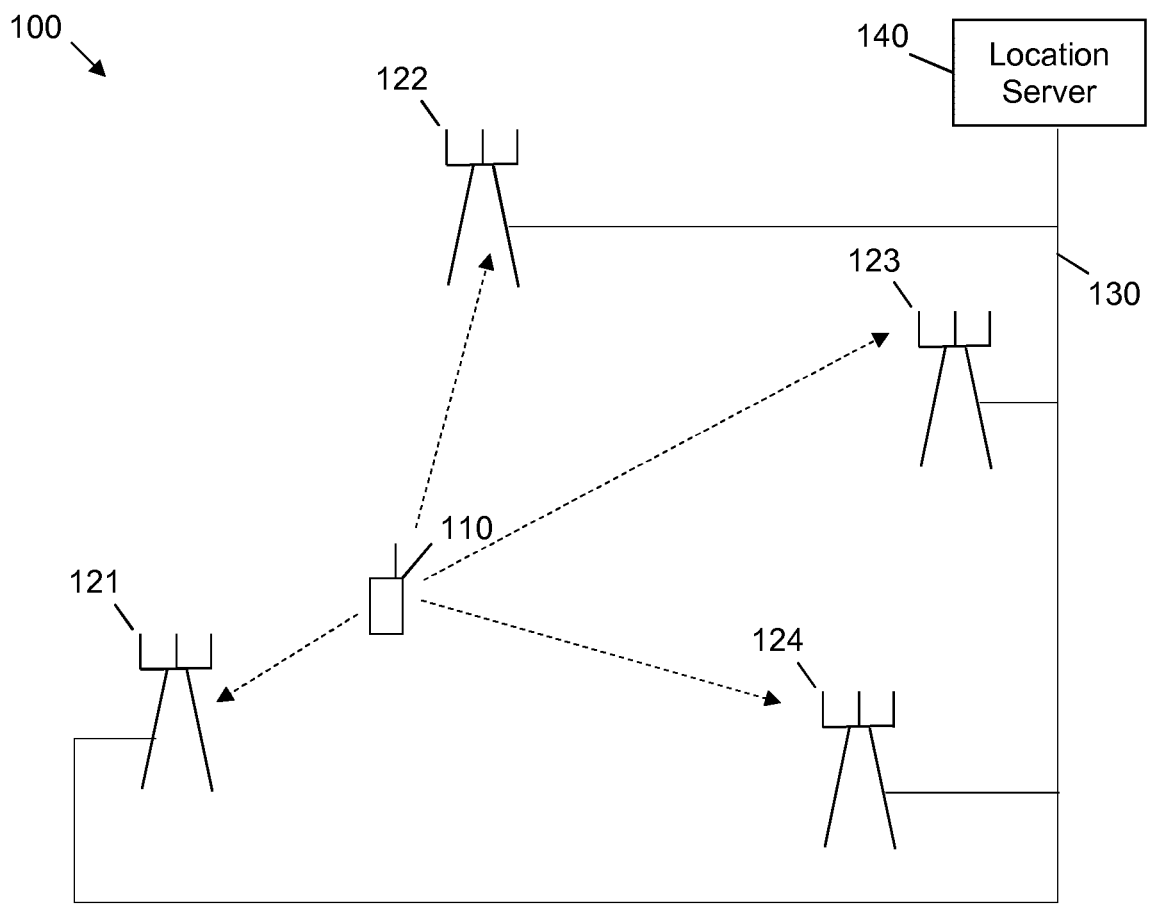
FIG. 1 shows schematically a wireless communication system according to an embodiment of the present invention.

FIG. 1 shows schematically a wireless communication system 100, for example a cellular-based wireless telecommunication network or wireless local area network (WLAN) or an ensemble of wirelessly communicating devices using for example wireless Bluetooth communication. The wireless communication system 100 comprises a first device 110 and a plurality of second devices. In the example shown in FIG. 1, the plurality of second devices comprises four devices 121 to 124. The first device 110 may comprise a movable or mobile device, for example a mobile telephone, an Internet of Things (IoT) device, a personal digital assistant, a mobile music player, a mobile computer, a mobile navigation system or a wearable electronic equipment. Each of the second devices 121 to 124 may comprise a mobile or stationary device, for example a base station or an access point of a wireless communication system, a desktop computer, a mobile telephone, for example a smart phone, a television set or any other device comprising capabilities as described below. The wireless communication system 100 may comprise furthermore a location server 140, which may be implemented for example as a cloud service connected to the Internet. The second devices 121 to 124 may be coupled to the location server 140 via a wireless or a wire based coupling 130, for example a local area network (LAN), a wide area network (WAN), a wireless local area network (WLAN), Bluetooth communication, a cellular communication network or a combination thereof.

For the first device 110, positioning may be required. Positioning of the first device 110 may comprise for example determining a geographic position of the first device 110 in terms of longitude, latitude and/or altitude. The first device 110 may be a moving device such that a continuous or repeated positioning of the first device 110 may be required. The second devices 121 to 124 may be aware of their positions. For example, the second devices 121 to 124 may comprise positioning technologies based on GPS, GNSS, A-GNSS, OTDOA, E-CID, UTDOA and so on. In another example, the positions of at least some of the second devices 121 to 124 may be pre-configured in a setup procedure.

Determining the position of the first device 110 may be based on triangulation. The first device 110 may emit a signal, for example a beacon signal, which may be received by the second devices 121 to 124 as indicated by the dashed arrows in FIG. 1. The signal may comprise a data packet with identification and optionally other information, for example a preamble, a checksum, user data and a broadcast address. Each of the second devices 121 to 124 receives the beacon signal and determines a corresponding distance between each of the second devices 121 to 124 and the first device 110 based on for example a received signal strength of the beacon signal. As an alternative, a time of flight of the beacon signal for travelling from the first device 110 to each of the second devices 121 to 124 may be measured for determining the corresponding distance. In this case, clocks of the first and second devices 110, 121 to 124 may be synchronized. The received signal strength or the determined distance may be transmitted from the second devices 121 to 124 to the location server 140 which performs a triangulation for determining the position of the first device 110. As an alternative, the received signal strength or the determined distance may be communicated among the second devices 121 to 124 and each of the second devices 121 to 124 may contribute to perform the triangulation or a master device of the second devices 121 to 124 may gather the distance information for determining the position of the first device 110. Furthermore, the received signal strength or the determined distance may be transmitted from the second devices 121 to 124 to a cloud service which combines this information for determining the position of the first device 110.

Figure 2:
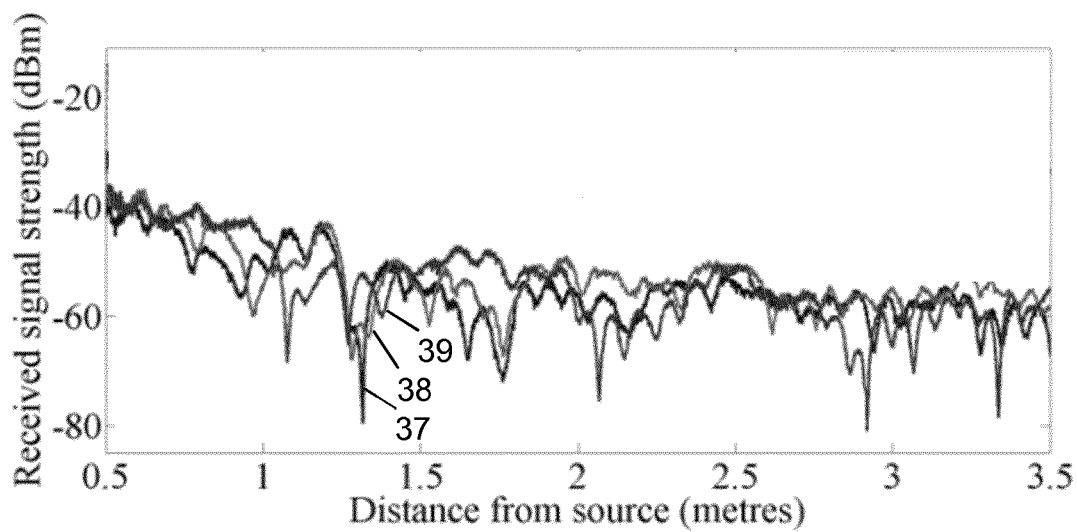
FIG. 2 shows schematically a signal strength of a beacon signal transmitted on three different channels as received at an observer device.

For example, in Bluetooth low energy (BT LE) 40 numbered channels are provided. Three broadcast channels numbered from 37 to 39 may be used for transmitting beacon signals for determining the position of the first device 110. The broadcast channels 37 to 39 are selected such that they are separated as much as possible in the frequency plane and do not interfere with most commonly used Wi-Fi channels 1, 6 and 11. Channel 37 may have a centre frequency of about 2402 MHz, channel 38 may have a centre frequency of about 2426 MHz and channel 39 may have a centre frequency of about 2480 MHz. The received signal strength may vary significantly depending on the distance and the channel/frequency as the received signal strength value may be disturbed by many sources of errors. For example an imperfect lobe of the transmitting antenna, an imperfect lobe of the receiving antenna, fading effects, reflections in different directions, frequency dependent variations, and disturbances from other radio technologies. FIG. 2 shows an example of a received signal strength of beacon signals on channels 37, 38 and 39 as a function of the distance from the first device 110 (source of the beacon signal). In particular, FIG. 2 shows fading effects, for example looking at the line of channel 37 and noticing the frequency dips that occur while increasing the distance between the beacon source and the receiver.

Every beacon signal may be "logically broadcasted" at the same time on the three physical channels 37 to 39. For example, the same beacon signal may be transmitted in direct sequence, for example within a time period of less than 100 ms, preferably in a time period of less then 10 ms and in particular within 1 ms. As an alternative, depending on the implementation, the beacon signal may be broadcasted physically at the same time on the three physical channels 37 to 39. A pause between two broadcasted beacon signals may be in a range of 100 ms to 1000 ms. Usually, a Bluetooth low energy receiver is tuned to one channel only. Therefore, two thirds of the broadcast are wasted. When the broadcast is used for connection setup between two devices, this waste of transmitted signals does not matter as the same information may be broadcasted on all three channels. However, when using the broadcasted beacon for positioning, information concerning the received signal strength of all channels may be used advantageously at all receiving devices (observer devices) as will be described in the following.

Figure 3:
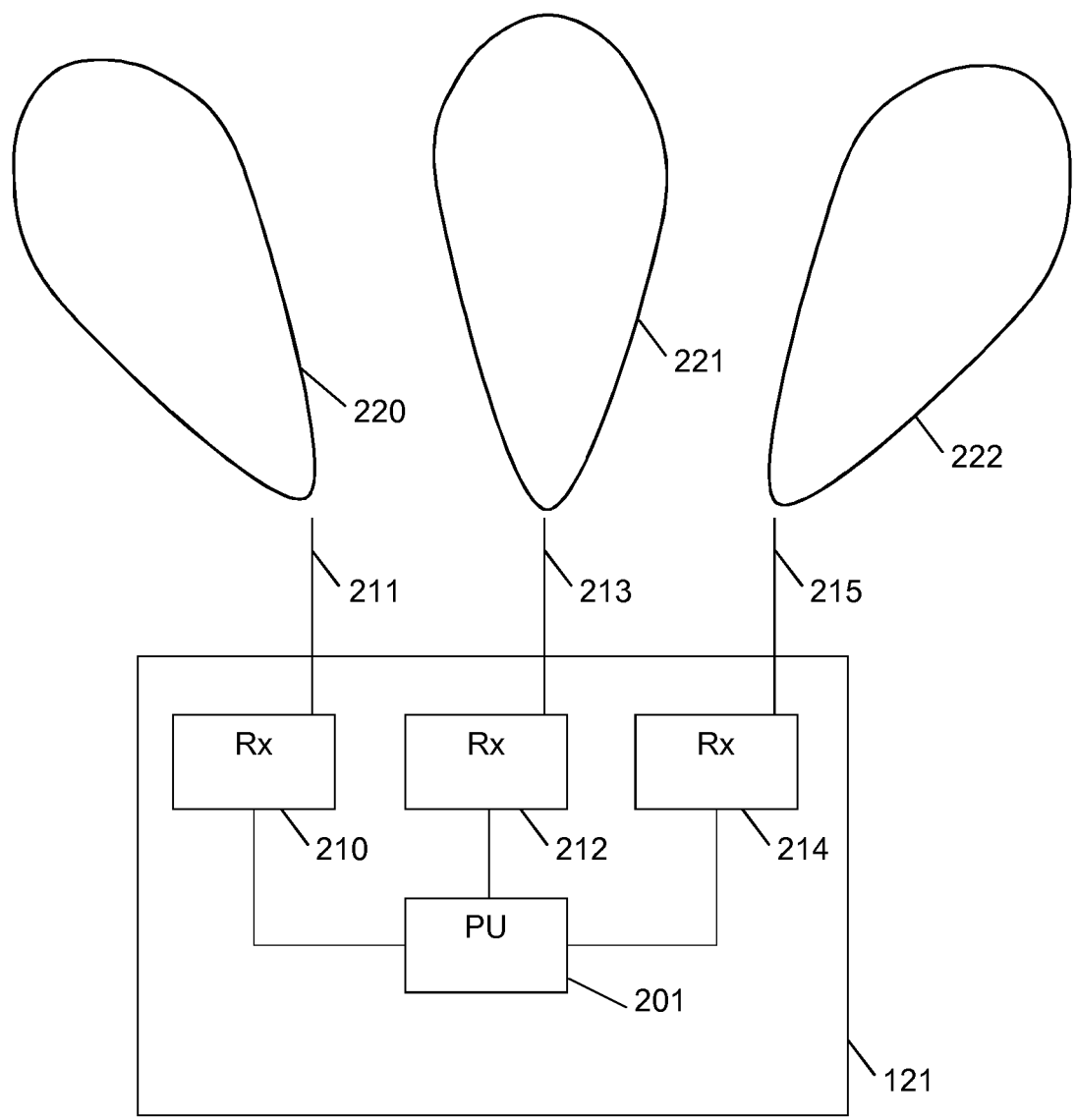
FIG. 3 shows schematically a device according to an embodiment of the present invention.

FIG. 3 shows the second device 121 in more detail. Although, in the following, the details of second device 121 are described in more detail, this description may also apply to the other second devices 122 to 124 of the wireless communication system 100 of FIG. 1.

Figure 4:
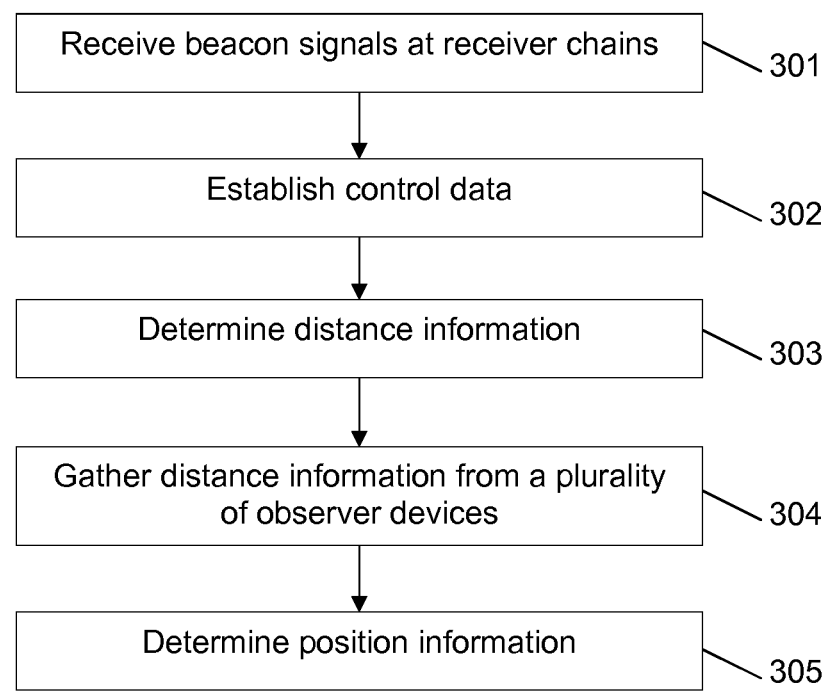
FIG. 4 shows schematically method steps of a method according to an embodiment of the present invention.

The second device 121 comprises a plurality of receiver chains. In the example of FIG. 3, the second device 121 comprises three receiver chains, a first receiver chain comprising receiver (Rx) 210 connected to an antenna 211, a second receiver chain comprising receiver (Rx) 212 connected to an antenna 213, and a third receiver chain comprising receiver (Rx) 214 connected to an antenna 215. The receivers 210, 212 and 214 are connected to a processing unit (PU) 201. The processing unit 210 may comprise a microprocessor and a memory. The second device 121 may comprise further components, for example an interface for communicating with the location server 140. Each antenna 211, 213 and 215 may have a corresponding receive lobe 220 to 222 as shown schematically in FIG. 3. However, each of the antennas 211, 213 and 215 may have an omnidirectional receive lobe or the lobes 220 to 222 may at least partially overlap each other. The processing unit 201 may process the signals received from the receiver chains 210 to 214 as will be described in the following in connection with FIG. 4.

In step 301, the processing unit 201 receives the broadcasted beacon signal, which may be broadcasted on three channels 37 to 39 defined in Bluetooth low energy, at the receiver chains 210 to 215. Based on the received beacon signal, the processing unit 201 establishes in step 302 control data indicative of a receive property of the beacon signal received from the first device 110 using the plurality of receiver chains 210 to 215. The receive property may comprise for example an amplitude and/or a phase of the received beacon signal. In particular, the receive property may comprise a receive signal strength of the beacon signal as received at the corresponding receiver chain. In case the beacon signal is broadcasted on the three Bluetooth low energy channels, the receive property may comprise an amplitude and/or a phase of the beacon signal received on channel 37, an amplitude and/or a phase of the beacon signal received on channel 38, and an amplitude and/or a phase of the beacon signal received on channel 39. The control data may comprise apart from the receive property a receive characteristic of the corresponding receiver chain with which the beacon signal was received. The receive characteristic may comprise information concerning a configuration and properties of the receiver chain with which the beacon signal was received. Thus, for example, the control data may comprise an antenna directionality, polarisation sensitivity and a receive bandwidth of the receiver chain in association with the received signal strength of the received beacon signal.

In step 303 positioning information for the first device is determined based on the control data. For example, the processing unit 201 may determine the positioning information based on the control data. As an alternative, the processing unit 201 may transmit the control data to the location server 140 which determines the positioning information for the first device 110 based on the control data. The positioning information for the first device may comprise for example a distance between the first device 110 and the second device 121. Likewise, the processing units of the other second devices 122 to 124 may determine corresponding distances between each of the second devices 122 to 124 and the first device 110. As an alternative, the location server 140 may determine for each of the second devices 121 to 124 a correspondent distance to the first device 110.

When determining the distance between the first device 110 and the second device 121, the processing unit 201 or the location server 140 may take advantage of the control data indicating the multiple received beacon signal. For example, each of the channels 37 to 39 may be treated separately. For example, each channel may be filtered separately and then the channel with the strongest received signal strength value may be used at each point in time for determining the distance information. As an alternative, the received signal strength values measured via the plurality of receiver chains may be averaged and the averaged received signal strength value may be used for determining the distance information.

Furthermore, different reception lobes of the antennas 211, 213 and 215 may be considered. For example, signals from the antennas having different rotations may be combined to compensate for imperfections in the lobe characteristics and to compensate for signals coming from different directions due to reflections. Furthermore, a distance of a few centimetres between the antennas may be used to compensate for local fading effects. As can be seen in FIG. 2, frequency dips that may occur while increasing the distance between the first device 110 and the second device 121 may be compensated. Furthermore, an assignment between the antennas 211, 213 and 215 and the receivers 210, 212, 214 may be varied such that reflections and local fading effects may be compensated for each channel.

As a result, by considering the three channels 37 to 39 simultaneously the whole transmit energy emitted from the first device 110 may be efficiently used in each of the second devices 121 to 124 for determining the distance information. This may contribute to reduce the power consumption for transmitting beacon signals in the first device 110, for example by increasing pauses between broadcasting the beacon signals, and the positioning of the first device 110 may be performed faster (up to 3 times) and more accurate due to improved quality and noise suppression.

In step 304 the location server may gather the distance information between the first device 110 and each of the second devices 121 to 124. In step 305 the position of the first device 110 is determined based on the plurality of distance information gathered in step 304. For example, the position of the first device 110 may be determined based on triangulation.

To sum up, the multiple receiver chains in the second devices (observer devices) 121 to 124 enable longer intervals between the transmission of beacon signals from the first device (target device) 110 which may increase battery lifetime of the first device 110. In addition, a better accuracy/precision on the position calculation may be achieved by simultaneously reception of all positioning beacon transmissions in parallel on each second device 121 to 124, by combining directional antennas, each on a different channel, to simulate/improve omnidirectional signal reception, and by using antenna features like directivity, polarisation and reception bandwidth for the positioning algorithms.

Thus, the following examples have been described.

EXAMPLES

Example 1

A method, comprising:
establishing control data indicative of a receive property of at least one signal received from a first device (110) by a second device (121-124) using a plurality of receiver chains (210-215), and
determining, based on the control data, positioning information for the first device (110),
wherein at least one receive characteristic of the plurality of receiver chains (210-215) differs for at least two receiver chains of the plurality of receiver chains.

Example 2

The method according to example 1, wherein the at least one signal comprises a beacon signal including an identifier indicative of the first device (110).

Example 3

The method according to example 1 or example 2, wherein the positioning information comprises at least one of a distance information relating to a distance between the first device (110) and the second device (121-124), and an angle information relating to an angle of arrival of the at least one signal at the second device (121-124).

Example 4

The method according to any one of the preceding examples, wherein establishing the control data comprises generating the control data based on the receive property and the at least one receive characteristic of the plurality of receiver chains (210-215).

Example 5

The method according to any one of examples 1-3, wherein establishing the control data comprises communicating the at least one receive property and the at least one receive characteristic of the plurality of receiver chains (210-215) from the second device (121-124) to a server (140).

Example 6

The method according to any one of the preceding examples, wherein determining the position information comprises communicating the control data to a server (140).

Example 7

The method according to any one of the preceding examples, wherein the at least one receive characteristic comprises a directionality of an antenna arrangement (211, 213, 215) associated with the respective receiver chain (210-215).

Example 8

The method according to any one of the preceding examples, wherein the at least one receive characteristic comprises a polarization sensitivity of an antenna arrangement (211, 213, 215) associated with the respective receiver chain (210-215).

Example 9

The method according to any one of the preceding examples, where the at least one receive characteristic comprises a receive bandwidth of the respective receiver chain (210-215).

Example 10

The method according to any one of the proceeding examples, wherein the at least one signal comprises a plurality of signals communicated on different wireless communication channels (37-39), wherein the plurality of receiver chains (210-215) comprises, for each one of the wireless communication channels (37-39), at least one receiver chain (210-215) associated with the respective wireless communication channel (37-39).

Example 11

The method according to example 10, wherein the at least one receive characteristic comprises a receive bandwidth of the respective receiver chain (210-215), the receive bandwidth corresponding to a bandwidth of the wireless communication channel (37-39) associated with the respective receiver chain (210-215).

Example 12

The method according to examples 10 or 11, wherein the plurality of signals are communicated on the wireless communication channels (37-39) within a time interval having a duration of not more than 15 ms, optionally of not more than 10 ms, further optionally of not more than 2 ms.

Example 13

The method according to any one of the proceeding examples, wherein the at least one signal comprises three signals communicated on three different wireless communication channels (37-39).

Example 14

The method according to any one of the proceeding examples, wherein the receive property comprises at least one of an amplitude and a phase of the at least one signal.

Example 15

The method according to any one of the preceding examples, wherein the at least one signal comprises a plurality of signals, different signals of the plurality of signals being received by different receiver chains of the plurality of receiver chains (210-215), wherein the control data is indicative of an association between the receiver chains (210-215) and the signals.

Example 16

The method according to any one of the preceding examples, wherein the at least one signal comprises a plurality of signals, different signals of the plurality of signals being received by different antenna arrangements (211, 213, 215) associated with the plurality of receiver chains (210-215), wherein the control data is indicative of an association between the receiver chains (210-215), the antenna arrangements (211, 213, 215), and the signals.

Example 17

The method according to any one of the preceding examples, wherein the at least one signal comprises a plurality of signals, different signals of the plurality of signals being received by different receiver chains of the plurality of receiver chains (210-215), wherein the control data is indicative of multiple sets of the plurality of signals received by the second device (121-124) using the plurality of receiver chains, wherein different sets of the multiple sets implement different associations between the plurality of receiver chains and the plurality of signals.

Example 18

The method according to any one of the preceding examples, wherein the at least one signal comprises a plurality of signals, different signals of the plurality of signals being received by different antenna arrangements (211, 213, 215) associated with the plurality of receiver chains (210-215), wherein the control data is indicative of multiple sets of the plurality of signals received by the second device (121-124) using the antenna arrangements (211, 213, 215) and the plurality of receiver chains (210-215), wherein different sets of the multiple sets implement different associations between the plurality of receiver chains (210-215), the antenna arrangements (211, 213, 215), and the plurality of signals.

Example 19

The method according to any one of the preceding examples, further comprising:
for each second device of multiple second devices (121-124): establishing respective control data indicative of a receive property of at least one signal received from the first device (110) by the respective second device (121-124) using a plurality of receiver chains (210-215),
for each second device of the multiple second devices (121-124): determining, based on the control data established by the respective second device, positioning information for the first device (110),
based on the positioning information determined by the multiple second devices (121-124): determining location information for the first device (110).

Example 20

The method according to any one of the preceding examples, further comprising:
for each receiver chain of the plurality of receiver chains (210-215): determining raw positioning information based on the receive property of the at least one signal received by the respective receiver chain,
averaging the raw positioning information for the plurality of receiver chains to determine the positioning information.

Example 21

The method according to any one of the preceding examples, further comprising:
for each receiver chain of the plurality of receiver chains (210-215): determining a received signal strength of the received at least one signal,
selecting one receiver chain of the plurality of receiver chains (210-215) based on the determined received signal strength, and
establishing the control data using the selected receiver chain.

Example 22

The method according to any one of the preceding examples, wherein each receiver chain of the plurality of receiver chains (210-215) is associated with a respective antenna arrangement (211, 213, 215), wherein a distance between two antenna arrangements is less than 10 cm.

Example 23

A device, comprising:
a plurality of receiver chains (210-215), wherein at least one receive characteristic of the plurality of receiver chains (210-215) differs for at least two receiver chains of the plurality of receiver chains (210-215), and
a processing unit (201) configured to
establish control data indicative of a receive property of at least one signal received from another device (110) using the plurality of receiver chains (210-215), and
determine, based on the control data, positioning information for the other device (110).

Example 24

The device of example 23, wherein the device (121-124) is configured to perform the method of any one of examples 1-22 as the second device and wherein the other device (110) is the first device.

Example 25

A system comprising:
a first device (110), and
a second device (121-124),
wherein the system (100) is configured to perform the method of any one of examples 1-22.

Example 26

The system of example 25, further comprising a server (140), wherein at least one of establishing the control data and determining the positioning information is performed by the server (140).

The invention claimed is:
1. A method, comprising:
establishing a control data indicative of a receive property of a plurality of signals received from a first device by a second device, using a plurality of receiver chains, each receiver chain including a receiver front end, different signals of the plurality of signals being received by different antenna arrangements associated with the plurality of receiver chains, the control data including an association among the plurality of receiver chains, antenna arrangements, and respective receiver front ends, wherein:
an assignment among different antenna arrangements and receiver front ends of the receiver chains is configured to be modified such that an antenna arrangement is assigned to a respective receiver front end based on the association, and
each signal of the plurality of signals is transmitted in a corresponding channel having a frequency and is received at a respective antenna arrangement based on the assignment, and
determining, based on the control data, positioning information for the first device, wherein:
at least one receive characteristic of the plurality of receiver chains differs for at least two receiver chains of the plurality of receiver chains,
the positioning information comprises at least one of a distance information relating to a distance between the first device and the second device, and an angle information relating to an angle of arrival of at least one signal of the plurality of signals at the second device, wherein each respective channel of each signal is filtered separately such that a channel having a strongest received signal strength value is used at each point in time for determining the distance information, the receive property indicates an amplitude and phase of each of the plurality of signals received from the first device, the at least one receive characteristic comprises a receive bandwidth of the respective receiver chain and at least one of:

a directionality of an antenna arrangement associated with the respective receiver chain, and a polarization sensitivity of the antenna arrangement associated with the respective receiver chain, wherein:

the control data is indicative of multiple sets of the plurality of signals received by the second device using the antenna arrangements and the plurality of receiver chains.

2. The method according to claim 1, wherein the plurality of signals comprises a beacon signal including an identifier indicative of the first device.

3. The method according to claim 1, wherein establishing the control data comprises generating the control data based on the receive property and the at least one receive characteristic of the plurality of receiver chains.

4. The method according to claim 1, wherein establishing the control data comprises communicating the receive property and the at least one receive characteristic of the plurality of receiver chains from the second device to a server.

5. The method according to claim 1, wherein determining the position information comprises communicating the control data to a server.

6. The method according to claim 1, wherein the plurality of signals are communicated on different wireless communication channels, wherein the plurality of receiver chains comprises, for each one of the wireless communication channels, at least one receiver chain associated with the respective wireless communication channel.

7. The method according to claim 6, wherein the at least one receive characteristic comprises a receive bandwidth of the respective receiver chain, the receive bandwidth corresponding to a bandwidth of the wireless communication channel associated with the respective receiver chain.

8. The method according to claim 6, wherein the plurality of signals are communicated on the wireless communication channels within a time interval having a duration of not more than 15 milliseconds (ms).

9. The method according to claim 1, wherein the plurality of signals comprises three signals communicated on three different wireless communication channels.

10. The method according to claim 1, further comprising:
for each second device of multiple second devices: establishing respective control data indicative of a receive property of a plurality of signals received from the first device by the respective second device using a plurality of receiver chains, for each second device of the multiple second devices: determining, based on the control data established by the respective second device, positioning information for the first device, based on the positioning information determined by the multiple second devices: determining location information for the first device.

11. The method according to claim 1, further comprising:
for each receiver chain of the plurality of receiver chains:
determining raw positioning information based on the receive property of the plurality of signals received by the respective receiver chain, averaging the raw positioning information for the plurality of receiver chains to determine the positioning information.

12. The method according to claim 1, further comprising:
for each receiver chain of the plurality of receiver chains:
determining a received signal strength of the received plurality of signals, selecting one receiver chain of the plurality of receiver chains based on the determined received signal strength, and establishing the control data using the selected receiver chain.

13. The method according to claim 1, wherein each receiver chain of the plurality of receiver chains is associated with a respective antenna arrangement, wherein a distance between two antenna arrangements is less than 10 cm.

14. A device, comprising:
a plurality of receiver chains, each receiver chain including a receiver front end, wherein at least one receive characteristic of the plurality of receiver chains differs for at least two receiver chains of the plurality of receiver chains, and a processing unit configured to:

establish a control data indicative of a receive property of a plurality of signals received from another device using the plurality of receiver chains, different signals of the plurality of signals being received by different antenna arrangements associated with the plurality of receiver chains, the control data including an association among the plurality of receiver chains, antenna arrangements, and respective receiver front ends wherein:

an assignment among different antenna arrangements and receiver front ends of the receiver chains is configured to be modified such that an antenna arrangement is assigned to a respective receiver front end based on the association, and each signal of the plurality of signals is transmitted in a corresponding channel having a frequency and is received at a respective antenna arrangement based on the assignment, and determine, based on the control data, positioning information for the other device, wherein:

the positioning information comprises at least one of a distance information relating to a distance between the other device and the device, and an angle information relating to an angle of arrival of at least one signal of the plurality of signals at the device, wherein each respective channel of each signal is filtered separately such that a channel having a strongest received signal strength value is used at each point in time for determining the distance information, the receive property indicates an amplitude and phase of each of the plurality of signals received from the other device, the at least one receive characteristic comprises a receive bandwidth of the respective receiver chain and at least one of:

a directionality of an antenna arrangement associated with the respective receiver chain, and a polarization sensitivity of the antenna arrangement associated with the respective receiver chain, wherein:

the control data is indicative of multiple sets of the plurality of signals received by the device using the antenna arrangements and the plurality of receiver chains.

* * * * *